(12) United States Patent
Shi et al.

(10) Patent No.: US 11,629,492 B2
(45) Date of Patent: Apr. 18, 2023

(54) INSTALLATION TOOL AND METHOD FOR SPHERICAL LATTICED SHELL STRUCTURE

(71) Applicant: CHINA CONSTRUCTION THIRD BUREAU FIRST ENGINEERING CO., LTD., Wuhan (CN)

(72) Inventors: Jun Shi, Wuhan (CN); Xuejun Sun, Wuhan (CN); Juan Li, Wuhan (CN); Yang Han, Wuhan (CN); Shisong Liu, Wuhan (CN)

(73) Assignee: CHINA CONSTRUCTION THIRD BUREAU FIRST ENGINEERING CO., LTD., Wuhan (CN)

( * ) Notice: Subject to any disclaimer, the term of this patent is extended or adjusted under 35 U.S.C. 154(b) by 0 days.

(21) Appl. No.: 17/852,353

(22) Filed: Jun. 28, 2022

(65) Prior Publication Data

US 2022/0325519 A1     Oct. 13, 2022

Related U.S. Application Data

(63) Continuation of application No. PCT/CN2021/132573, filed on Nov. 23, 2021.

(30) Foreign Application Priority Data

Nov. 27, 2020   (CN) .......................... 202011364983.9

(51) Int. Cl.
*E04B 1/35* (2006.01)
*E04B 1/32* (2006.01)

(52) U.S. Cl.
CPC .......... *E04B 1/3544* (2013.01); *E04B 1/3211* (2013.01); *E04B 2001/3235* (2013.01)

(58) Field of Classification Search
CPC ....... B66C 1/10; E04B 1/3544; E04B 1/3211; E04B 1/3404; E04B 1/3412;
(Continued)

(56) References Cited

U.S. PATENT DOCUMENTS 2,222,588 A * 11/1940 Williams ............... H01Q 1/103
343/903
2,857,994 A * 10/1958 Sheard .................... E04H 12/34
212/176
8,042,305 B2 * 10/2011 Pryor ..................... B64G 1/222
244/172.6

FOREIGN PATENT DOCUMENTS

CN        201610593 U      10/2010
CN        106337501 A       1/2017
(Continued)

OTHER PUBLICATIONS

International Search Report issued in corresponding International application No. PCT/CN2021/132573, dated Feb. 9, 2022.
(Continued)

*Primary Examiner* — Jessica L Laux

(57) ABSTRACT

An installation tool and method for spherical latticed shell structure is provided. The spherical latticed shell structure includes a plurality of latticed shell units. The installation tool includes a support frame, a hoisting system, a fixing frame and stay rope assemblies. The support frame is arranged on one side of a to-be-installed spherical latticed shell structure. The fixing frame is connected with the hoisting system. The hoisting system is arranged on the support frame for hoisting the fixing frame. The stay rope assemblies are connected with the fixing frame and the latticed shell units.

7 Claims, 6 Drawing Sheets

(58) Field of Classification Search
CPC ......... E04B 1/34807; E04B 2001/3235; E04B 2001/3217; E04B 2001/3229
See application file for complete search history.

(56) References Cited

FOREIGN PATENT DOCUMENTS

| | | | |
|---|---|---|---|
| CN | 107130688 | A | 9/2017 |
| CN | 108532767 | A | 9/2018 |
| CN | 109716978 | A | 5/2019 |
| CN | 110130644 | A | 8/2019 |
| CN | 110924690 | A | 3/2020 |
| CN | 111677292 | A | 9/2020 |
| CN | 112625953 | A | 4/2021 |
| EP | 0432133 | A1 | 6/1991 |
| JP | 2000320135 | A | 11/2000 |

OTHER PUBLICATIONS

Written Opinion of the International Search Authority in corresponding International application No. PCT/CN2021/132573.

* cited by examiner

INSTALLATION TOOL AND METHOD FOR SPHERICAL LATTICED SHELL STRUCTURE

FIELD

The present disclosure relates to buildings, and particularly relates to an installation tool and method for a spherical latticed shell structure.

BACKGROUND

In recent years, with the continuous construction of venues such as science and technology exhibition halls and dome cinemas, hyperhemispherical latticed shell structures have attracted the attention of some architects and structural engineers due to unique charms such as unique design concept, novel structure, safety and environment friendliness, and particular attraction to the attention of the public, and it has the advantages such as free latticed division, uniform and reasonable stress, light weight and high rigidity. A dome screen of a dome cinema looks like the arch of the sky to encompass audiences inside and shows a high-definition picture accompanied with surround sound, which makes people feel as if they were personally on the scene, the on-the-spot effect is very shocking, and therefore, it has been widely applied to various practical engineering such as large-scale exhibitions, celebrations and outdoor activities.

A dome structure is in a layout form of a sphere-like or hemispheric spatial structure, is a stress system of spatial structure and is required to form a stabilization system of spatial stress as soon as possible in an installation process. At present, the known installation method is to perform in-situ installation of spare parts by erecting support frames in a full hall. Since an ordinary spherical latticed shell structure is larger in radius, huge workload of erecting and removing the support frames in the full hall on site, installation complexity, high measure expense, more spatial force bearing points, stress system conversion complexity and high safety risks are caused.

DETAILED DESCRIPTION OF EMBODIMENTS

The present disclosure will be further described in detail below with reference to the accompanying drawings and specific embodiments.

An installation tool for a spherical latticed shell structure as shown in FIG. 1 to FIG. 9 includes a support frame 1, a hoisting system 2, a fixing frame 3 and stay rope assemblies 4.

Figure 1:
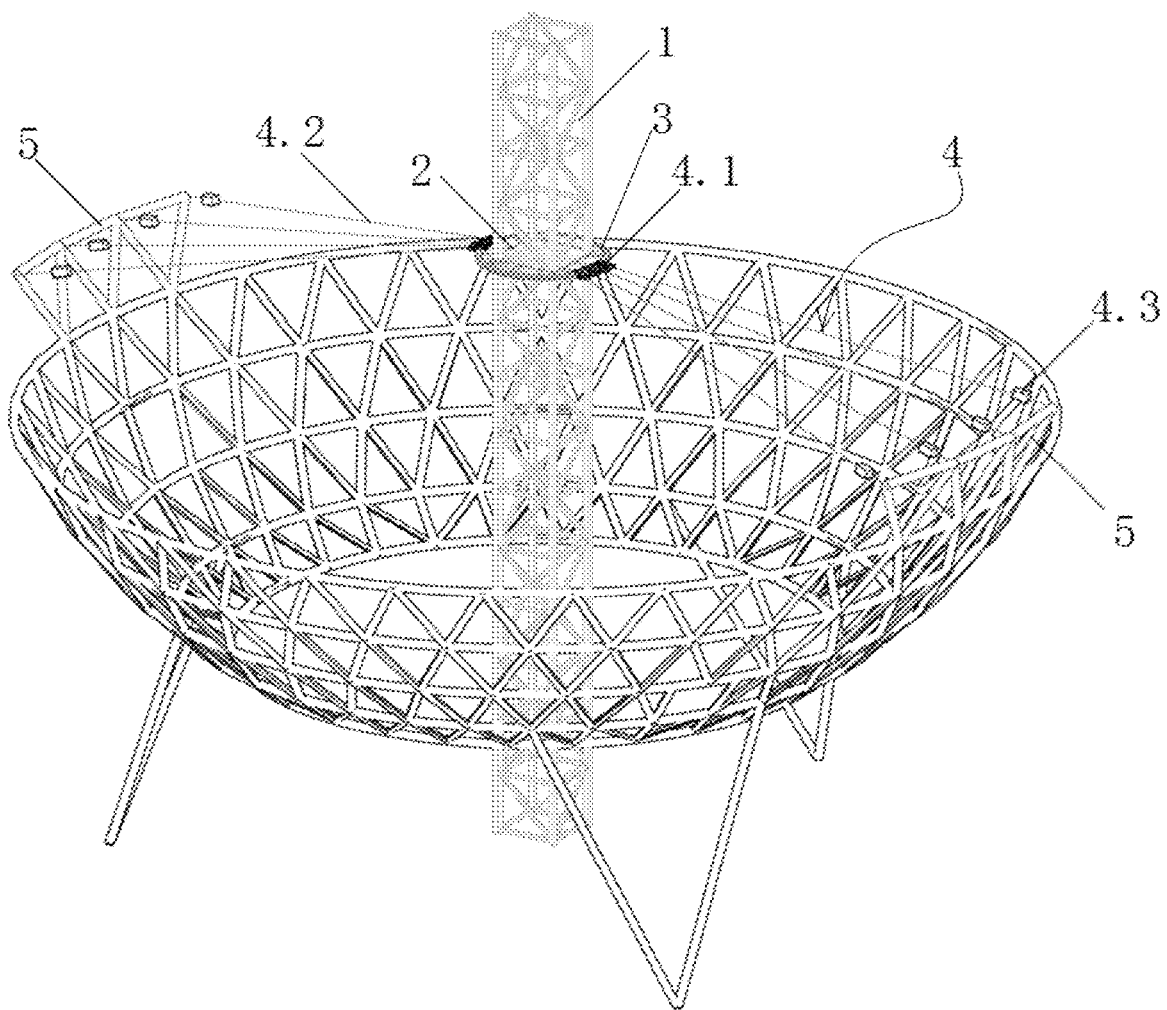
FIG. 1 is a schematic view showing installation of an installation tool for a spherical latticed shell structure according to the present disclosure.
Figure 2:
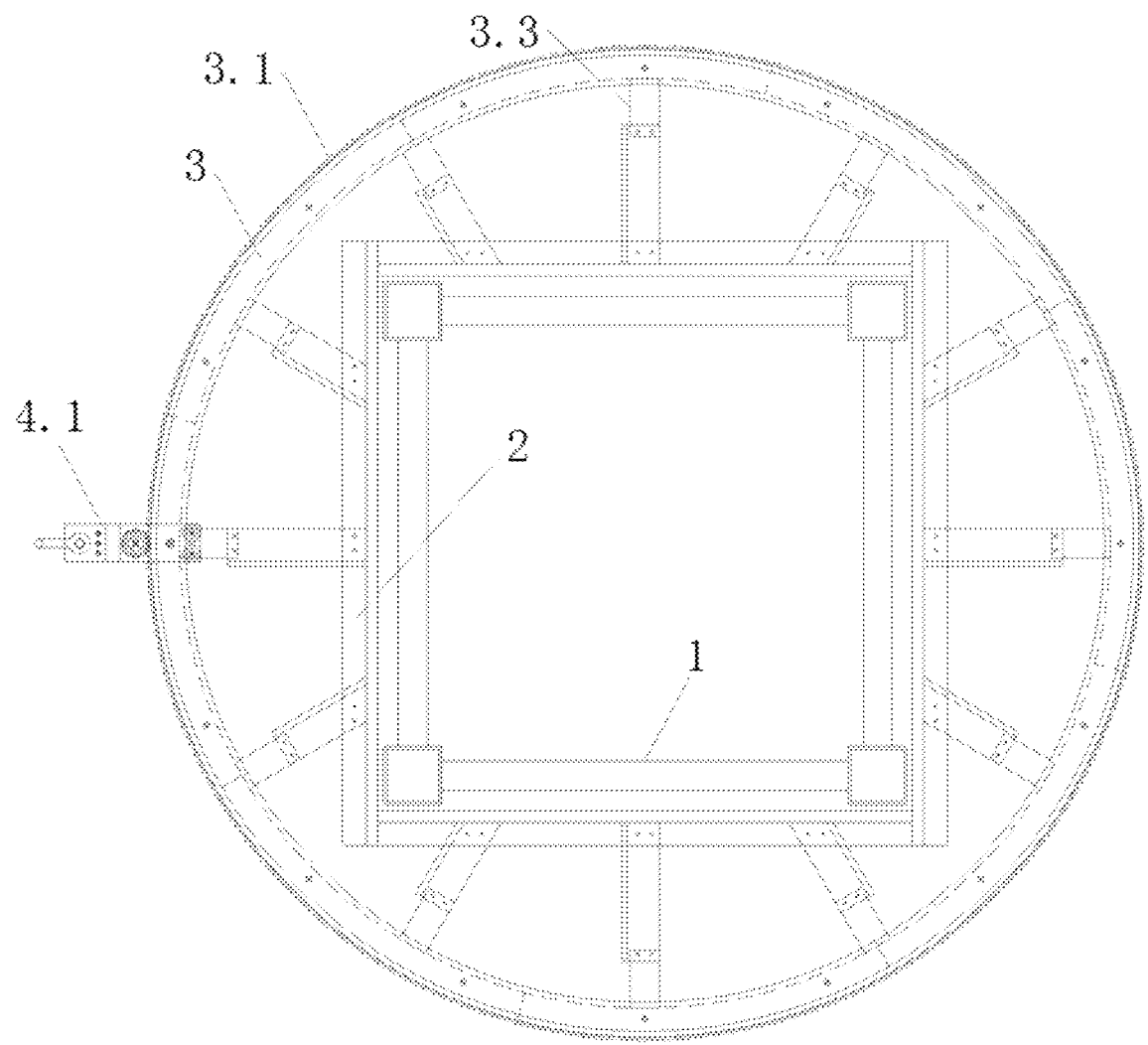
FIG. 2 is a schematic view showing a partial top-view structure that a movable adjusting device is arranged on a fixing frame of the installation tool according to the present disclosure.
Figure 9:
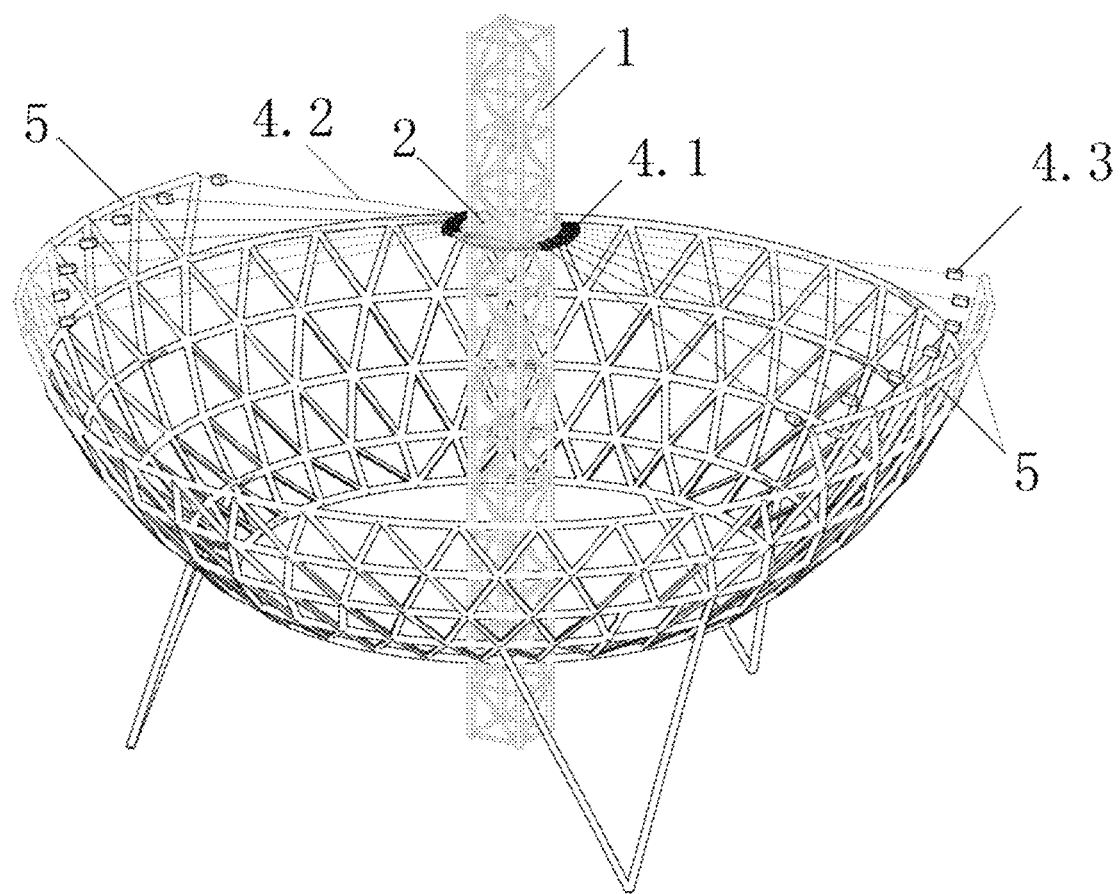
FIG. 9 is a schematic view showing installation of other latticed shell units on the same horizontal layer by the installation tool in FIG. 1.

As shown in FIG. 1 and FIG. 9, the spherical latticed shell structure in the present embodiment includes a plurality of latticed shell units 5. The spherical latticed shell structure includes a plurality of horizontal layers. The plurality of latticed shell units 5 are connected into a horizontal annular latticed shell structure on each horizontal layer. The outer end of the annular latticed shell structure is an arc surface. The sizes of the plurality of latticed shell units 5 on the same horizontal layer may be the same or different. The sizes of the latticed shell units 5 on the different horizontal layers are generally different.

The support frame 1 is arranged on one side of a to-be-installed spherical latticed shell structure. The support frame 1 in the present embodiment is a latticed frame body and is vertically arranged on a central position on the inner side of the to-be-installed spherical latticed shell structure. The hoisting system 2 is arranged on the support frame 1 and is used for hoisting the fixing frame 3 connected with the hoisting system 2.

The stay rope assemblies 4 are connected with the fixing frame 3 and the latticed shell units 5. The stay rope assemblies 4 include stay ropes 4.2. That is, to-be-installed latticed shell units 5 in the present embodiment are connected to the fixing frame 3 by the stay ropes 4.2 before being completely fixed, thereby forming a stable stress system facilitating overall fixation. In order to ensure that the stability and balance of the stress system, spatially extended lines of the stay ropes 4.2 are intersected with a vertical central line of the fixing frame 3. The vertical central line of the fixing frame 3 is coincident with a vertical central line of the spherical latticed shell structure.

Each stay rope assembly 4 in the present embodiment further includes a movable adjusting device 4.1 and a tightening assembly 4.3 for adjusting the length of the stay rope 4.2. The movable adjusting device 4.1 is mainly used for adjusting the position where the stay rope 4.2 is connected with the fixing frame 3, so that the position of the stay rope 4.2 relative to the fixing frame 3 is adjustable to adapt to the installation of the latticed shell units 5 on different positions on the same horizontal layer. Certainly, when sufficient stay ropes 4.2 are arranged, the movable adjusting device 4.1 may also be omitted, that is, when the latticed shell units 5 corresponding to different positions are installed, the stay ropes 4.2 on the corresponding positions are selected to connect the latticed shell units 5 and the fixing frame 3.

In addition, the structure of the movable adjusting device 4.1 is different according to a different structure of the fixing frame 3. In the present embodiment, key structures of the fixing frame 3 and the movable adjusting device 4.1 lie in that: the movable adjusting device 4.1 is movable on the fixing frame 3 along the horizontal circumferential direction of the spherical latticed shell structure. A motion trajectory is preferably a horizontal circular trajectory. That is, the conditions that the movable adjusting device 4.1 is movable on the fixing frame 3 and the motion trajectory is in the horizontal circumferential direction of the spherical latticed shell structure are just required to be met. The shape of the fixing frame 3 is not specifically limited. Certainly, the fixing frame 3 is preferably a circular frame or circular ring frame arranged horizontally, or may be of other shapes. For example, the fixing frame 3 is a rectangular frame or rectangular plate arranged horizontally and is provided with a circular structure, such as a circular orbit, facilitating the motion of the movable adjusting device 4.1.

The position where the tightening assembly 4.3 for adjusting the length of the stay rope 4.2 may be arranged any position on the stay rope as long as the length adjustment of the stay rope may be achieved, and meanwhile, the axis direction of the stay rope should be prevented from being changed. In order to facilitate the installation of the latticed shell units 5, the tightening assembly 4.3 is arranged on the end, close to the latticed shell units 5, of the stay rope.

In order to ensure that the stress system is stable during installation, the two symmetric latticed shell units 5 on the same horizontal layer are synchronously installed, and therefore, at least two stay rope assemblies 4 are provided. Certainly, in the present embodiment, each latticed shell unit 5 is preferably connected with two or three or four stay rope assemblies 4, and an axis direction of the stay rope of each stay rope assembly 4 is intersected with a vertical central line of the fixing frame 3 (namely the vertical central line of the spherical latticed shell structure), and thus, the stay ropes, the fixing frame 3 and the latticed shell units 5 form the stable stress system.

The stay ropes 4.2 may be steel wire ropes or combinations of rods and ropes, for example, two ends of a reinforcing steel bar are provided with steel wire ropes.

In order to reduce the manufacturing cost and facilitate transportation, the circular ring fixing frame 3 includes a plurality of concentric and equal-diameter arc-shaped frame units which are spliced or abutted end to end. That is, the fixing frame 3 is formed by splicing a plurality of arc-shaped frame units.

Referring to FIG. 2, FIG. 3, FIG. 4, FIG. 5, FIG. 7 and FIG. 8, the fixing frame 3 in the present embodiment includes a gear disc 3.1, fixing discs 3.2 and connecting plates 3.3. The gear disc 3.1 is an annular external gear which is arranged horizontally. The fixing discs 3.2 are circular ring members which are arranged horizontally and are concentric with the gear disc 3.1. The fixing discs 3.2 are arranged on the upper and lower ends of the gear disc 3.1. The connecting plates 3.3 are connected with the gear disc 3.1 and the hoisting system 2. Specifically, each in the group consisting of the gear disc 3.1 and the fixing discs 3.2 is divided into a plurality of arc-shaped units. Splicing seams of the arc-shaped units of the gear disc 3.1 and splicing seams of the arc-shaped units of the fixing discs 3.2 are staggered. The fixing discs 3.2 clamps the gear disc 3.1 on the upper and lower ends of the gear disc 3.1, and are connected by using a bolt. Two ends of the bolt do not extend out of the end surfaces of the fixing discs 3.2 so as to facilitate the motion of the movable adjusting device 4.1 along the fixing discs 3.2. The gear disc 3.1 is provided with teeth on the outer end and is uniformly provided with the plurality of connecting plates 3.3 on the inner end. One end of each connecting plate 3.3 is connected with the gear disc 3.1, and the other ends of the connecting plates 3.3 are connected with the hoisting system 2. Therefore, the gear disc 3.1, the fixing discs 3.2 and the connecting plates 3.3 are integrated to vertically ascend or descend along with the hoisting system 2.

Figure 3:
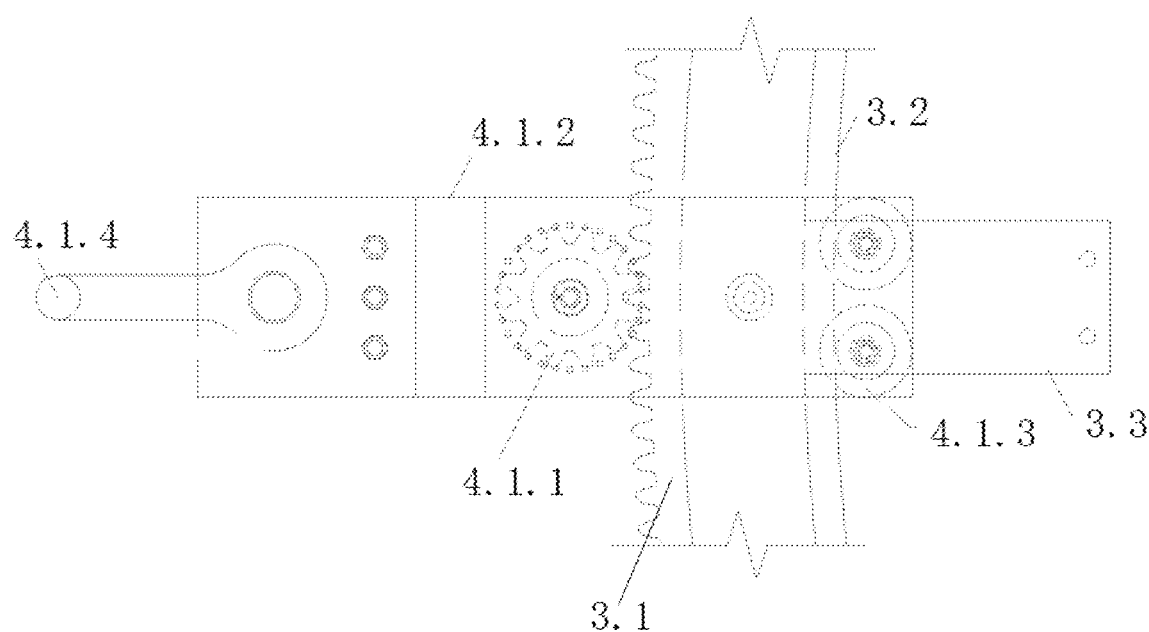
FIG. 3 is a schematic view showing an enlarged part of the movable adjusting device in FIG. 2.
Figure 4:
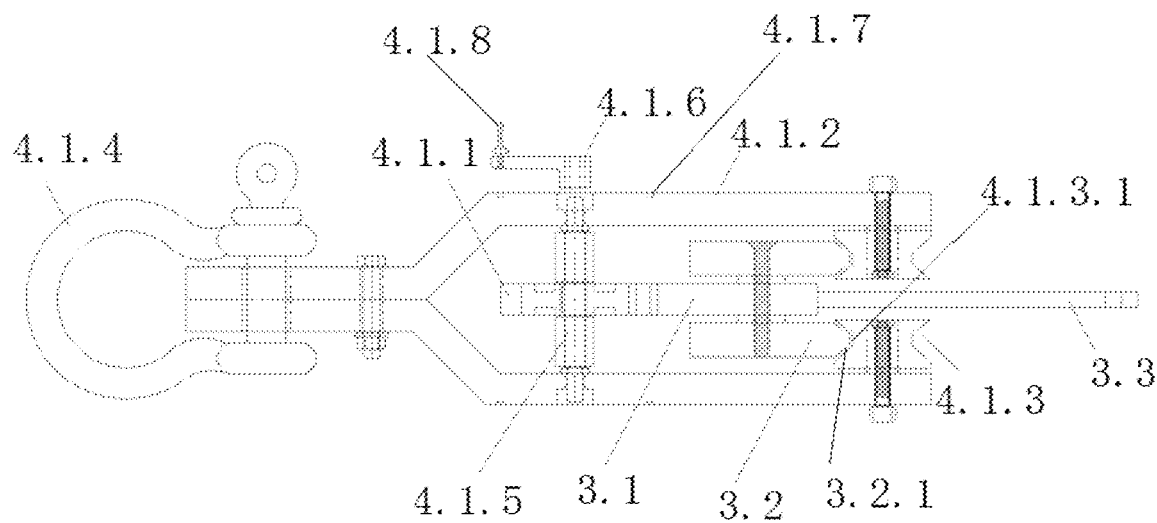
FIG. 4 is a schematic view showing a main-view structure in FIG. 3.
Figure 5:
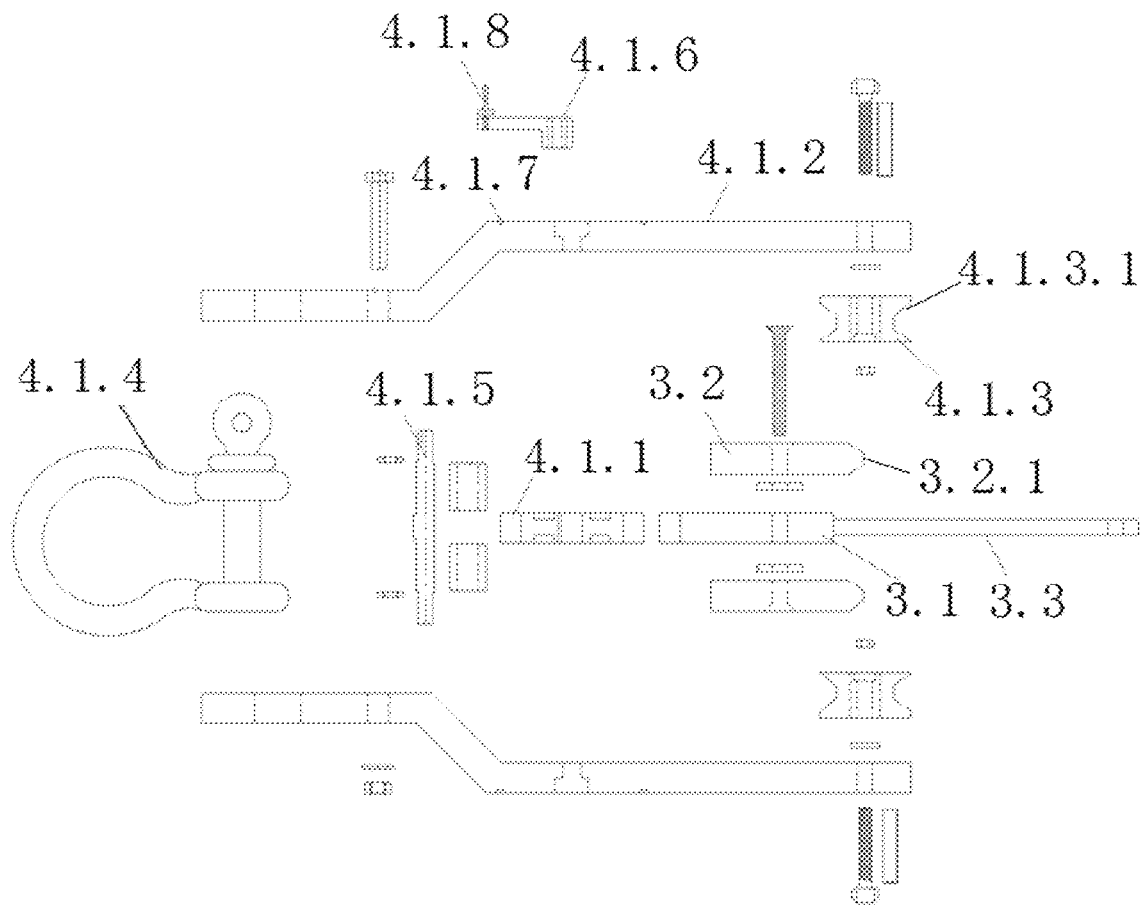
FIG. 5 is a schematic view showing an exploded structure in FIG. 4.

Referring to FIG. 3, FIG. 4 and FIG. 5, the movable adjusting device 4.1 in the present embodiment includes a rotating wheel 4.1.1, force transfer plates 4.1.2, bearing wheels 4.1.3 and a snap ring 4.1.4. The rotating wheel 4.1.1 and the bearing wheels 4.1.3 are respectively arranged on the outer end of the gear disc 3.1 and the inner ends of the fixing discs 3.2 by the force transfer plates 4.1.2. The rotating wheel 4.1.1 is meshed with the outer end of the gear disc 3.1. The bearing wheels 4.1.3 are movably matched with the inner ends of the fixing discs 3.2. The snap ring 4.1.4 is arranged on the force transfer plates 4.1.2, and is connected with the stay rope.

In order to improve the stress stability, the two force transfer plates 4.1.2 are provided and are oppositely arranged. One end of each of the two force transfer plates 4.1.2 is abutted one another and is connected with the snap ring 4.1.4 after being connected by using the bolt. The other ends of the two force transfer plates 4.1.2 are spaced for a distance and are parallel to each other. The rotating wheel 4.1.1 is arranged in the space between the other ends. The gear disc 3.1 and the fixing discs 3.2 are located in the space. The rotating wheel 4.1.1 is meshed with the teeth on the outer end of the gear disc 3.1. The two bearing wheels 4.1.3 are further provided and are respectively matched with the inner ends of the two fixing discs 3.2. In the present embodiment, a vertical central line of the rotating wheel 4.1.1 is kept parallel to vertical central lines of the bearing wheels 4.1.3.

The center of the rotating wheel 4.1.1 is nested with a wheel axle 4.1.5, and two ends of the wheel axle 4.1.5 are nested into the two force transfer plates 4.1.2. In order to ensure that the movable adjusting device 4.1 is stably connected with the fixing frame 3, the inner ends of the fixing discs 3.2 are provided with bulges 3.2.1 arranged along the circumferential directions of the fixing discs 3.2, and the outer ends of the bearing wheels 4.1.3 are provided with grooves 4.1.3.1 matched with the bulges 3.2.1. Certainly, the bulges 3.2.1 of the fixing discs 3.2 and the grooves 4.1.3.1 of the bearing wheels 4.1.3 may be arranged alternately, that is, the inner ends of the fixing discs 3.2 are provided with the grooves 4.1.3.1, the outer ends of the bearing wheels 4.1.3 are provided with the bulges 3.2.1. The bulges 3.2.1 and the grooves 4.1.3.1 are arranged for limiting the axial displacements of the bearing wheels 4.1.3 and ensuring that the motion trajectories of the bearing wheels 4.1.3 along the inner ends of the annular fixing discs 3.2 are horizontally circular.

The movable adjusting device 4.1 further includes a rotation driving member for driving the rotating wheel 4.1.1 to rotate. The rotation driving member may be a manually-operated device or an electrically-operated device. In order to facilitate operation, the rotation driving member in the present embodiment selects a rotating handle 4.1.6. One end of the rotating handle 4.1.6 is connected with the wheel axle 4.1.5. By rotating the other end of the rotating handle 4.1.6, the wheel axle 4.1.5 and the rotating wheel 4.1.1 connected with the wheel axle 4.1.5 may be driven to rotate. The rotating wheel 4.1.1 is meshed with a gear of the gear disc 3.1 during rotation, so that the control precision of the displacement is improved. When the rotating wheel 4.1.1 rotates, the bearing wheels 4.1.3 on the force transfer plates 4.1.2 are matched with the inner ends of the fixing discs 3.2. The overall movable adjusting device 4.1 may move along the circumferential direction of the gear disc 3.1, and thus, the adjustment for the position and the angle of the stay rope connected with the snap ring 4.1.4 is achieved.

Figure 6:
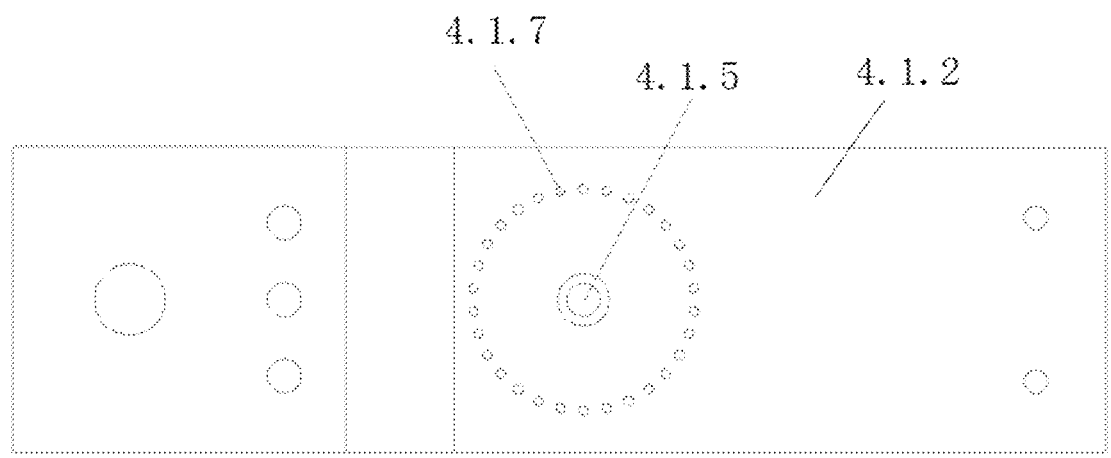
FIG. 6 is a schematic view showing a top-view structure of a force transfer plate in FIG. 5.
Figure 7:
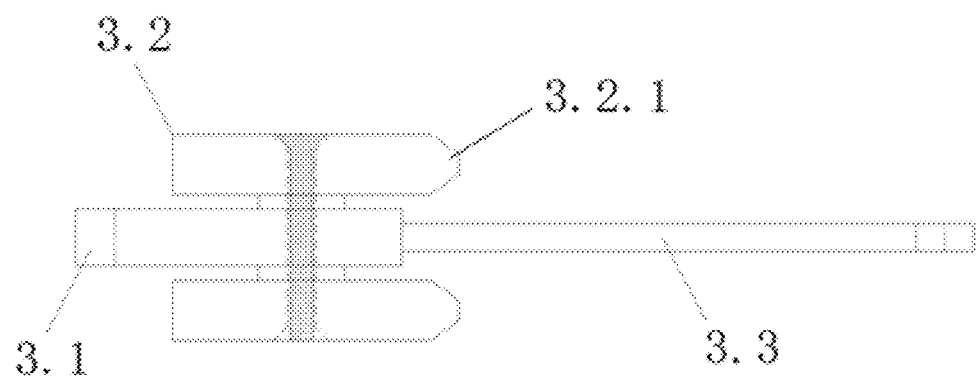
FIG. 7 is a schematic view showing an enlarged structure of a fixing frame in FIG. 4.
Figure 8:
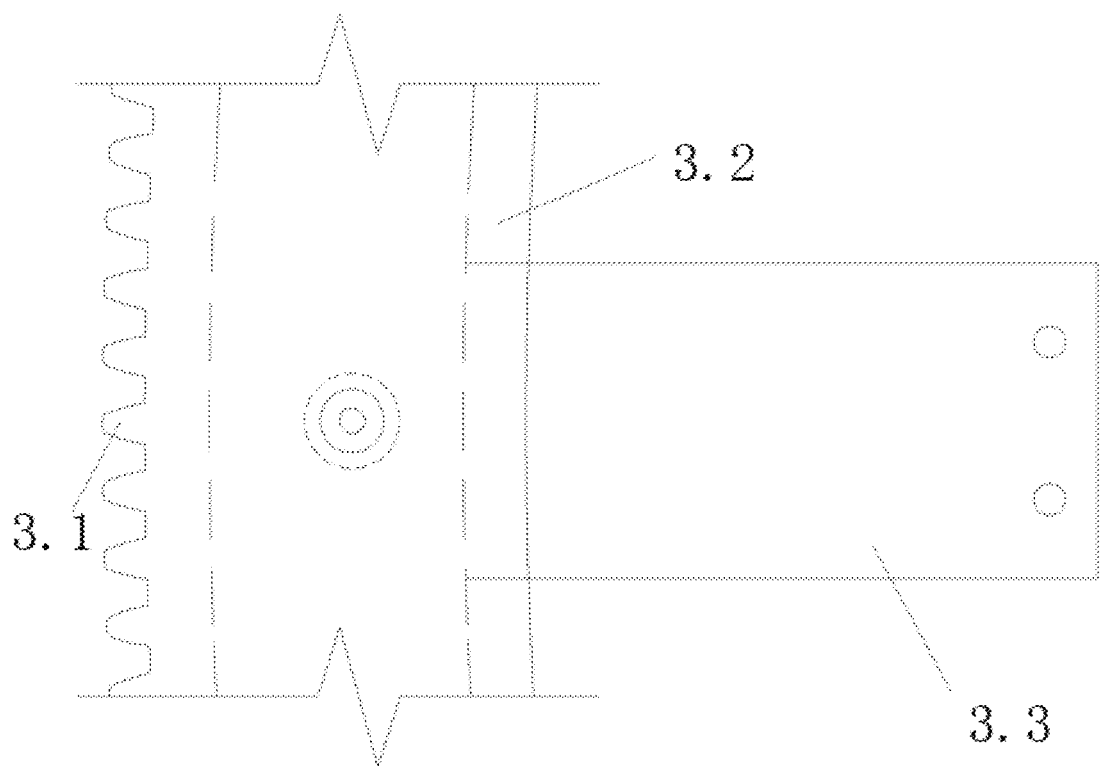
FIG. 8 is a schematic view showing a top-view structure in FIG. 7.

The rotation driving member or each force transfer plate 4.1.2 is provided with a locking member for limiting the rotation of the rotating wheel 4.1.1. When the rotation driving member adopts an electrically-operated device such as a rotating motor, the locking member may be a part of the electrically-operated device. In the present embodiment, the rotation driving member is the rotating handle 4.1.6, and therefore, the locking member is required to be additionally arranged. Referring to FIG. 6, the upper end surfaces of the force transfer plates 4.1.2 are provided with locking holes 4.1.7 along the circumferential direction of the wheel axle 4.1.5. The upper end of the rotating handle 4.1.6 is provided with a vertically movable locking rod 4.1.8, and the rotating handle 4.1.6 may be locked as long as the locking rod 4.1.8 is inserted to the locking holes 4.1.7. Certainly, the locking member may also be of other similar structures as long as it is a device or structure capable of limiting the rotation of the rotating handle 4.1.6 relative to the force transfer plates 4.1.2, for example, the rotating handle 4.1.6 is provided with a finished product of a push-pull fast clamp.

Fast installation of the latticed shell units of the same layer can be realized through the fixing frame and the stay rope assemblies, and the force balance and stability of the latticed shell units of the same layer can be ensured, and the construction efficiency of the latticed shell units of the same layer is improved. The hoisting system realizes the hoisting of the fixed frame, realizes the rapid installation layer by layer of the spherical latticed shell structure, and the overall construction efficiency of the spherical latticed shell structure is improved. In addition, the tool has a simple structure, convenient disassembly and assembly, reduces the construction labor intensity and cost, simplifies the force system, ensures the balance and stability of the force, and reduces the safety risk.

An installation method for a spherical latticed shell structure by using an installation tool includes the following steps.

Step 1: the support frame 1 is installed on inner side of a to-be-installed spherical latticed shell structure; the hoisting system 2 is installed on the support frame 1, and the fixing frame 3 is installed on the hoisting system 2; and a plurality of stay rope assemblies 4 are symmetrically arranged along the circumferential direction of the fixing frame 3. The support frame 1 is installed in a manner in the prior art, the hoisting system 2 may also be existing equipment and the hoisting system 2 is installed on the support frame 1 in a manner of an existing conventional construction method. The position where the support frame 1 is arranged needs to be planned in advance. The support frame 1 is installed on a vertical central axis of the spherical latticed shell structure according to the position of the to-be-installed spherical latticed shell structure. The installed fixing frame 3 has to ensure that the distance from the outer end of the fixing frame 3 (the outer end of the gear disc 3.1 in the present embodiment) to the inner end of the to-be-installed spherical latticed shell structure on a horizontal plane where the fixing frame 3 is located is the same.

Step 2: symmetric to-be-installed latticed shell units 5 on the same horizontal layer of the to-be-installed spherical latticed shell structure are hoisted to to-be-installed positions on upper ends of installed latticed shell units on a lower layer; the hoisting system 2 hoists the fixing frame 3 to be higher than horizontal heights of the to-be-installed positions; the lower ends of the to-be-installed latticed shell units 5 are connected with the upper ends of the installed latticed shell units; the upper ends of the to-be-installed latticed shell units 5 are connected with the stay rope assemblies 4; and positions of the stay rope assemblies 4 and the to-be-installed latticed shell units 5 are adjusted to ensure that the to-be-installed latticed shell 5 are stressed uniformly and stably. When the installed latticed shell units on the lower layer are located on the lowest layer of the spherical latticed shell structure, the latticed shell units on the lowest layer may be installed without the installation tool in the present embodiment as long as all the latticed shell units on the lowest layer are directly fixed to corresponding positions according to layout design. When the latticed shell units on the lowest layer need to be installed by using the installation tool in the present embodiment, the lower ends or outer sides or inner sides of the latticed shell units on the lowest layer may be provided with a temporary support structure or foundation.

Step 3: the step 2 is repeated to complete the installation and fixation of all the to-be-installed latticed shell units 5 on the same horizontal layer, and the stay rope assemblies 4 on the to-be-installed latticed shell units 5 on the same horizontal layer are removed. That is, after the two symmetric to-be-installed latticed shell units 5 on the same horizontal layer are installed and fixed, other to-be-installed latticed shell units 5 on the same horizontal layer adjacent to the installed latticed shell units may be installed along a clockwise or anti-clockwise direction until all the latticed shell units 5 on the same horizontal layer are installed and fixed completely. Referring to FIG. 1 and FIG. 9, after the two opposite latticed shell units in FIG. 1 are installed, the adjacent latticed shell units as shown in FIG. 9 are installed and fixed.

Step 4: the step 2 and the step 3 are repeated to complete the installation of the spherical latticed shell structure. After all the latticed shell units on the next horizontal layer are installed completely, all the latticed shell units on the previous horizontal layer are installed by adopting the step 2 and the step 3; and the steps are performed in sequence until all the latticed shell units on the spherical latticed shell structure are installed and fixed completely.

Compared with an existing full-hall frame installation manner, the manner of installing the spherical latticed shell structure by using the installation tool in the present embodiment has the advantages that the stress system is simplified, the stress structure is stable, the construction efficiency and the construction quality are improved, and the construction period is greatly shortened.

What is claimed is:

1. An installation tool for a spherical latticed shell structure, the spherical latticed shell structure comprising a plurality of latticed shell units, wherein the installation tool comprises:
    a support frame, a hoisting system, a fixing frame, and stay rope assemblies;
    the support frame is arranged on one side of a to-be-installed spherical latticed shell structure;
    the fixing frame is connected with the hoisting system, the hoisting system is arranged on the support frame for hoisting the fixing frame; and
    the stay rope assemblies are connected with the fixing frame and the latticed shell units;
    the stay rope assembly comprises a movable adjusting device and a stay rope, the movable adjusting device is connected with the stay rope; the stay rope is connected with the latticed shell units; and the movable adjusting device is movably connected with the fixing frame along a horizontal circumferential direction of the spherical latticed shell structure;
    the fixing frame comprises a gear disc, fixing discs and connecting plates; the gear disc is an annular external gear which is arranged horizontally; the fixing discs are circular ring members which are arranged horizontally and are concentric with the gear disc, and the fixing discs are arranged on upper and lower ends of the gear disc; and the connecting plates are connected with the gear disc and the hoisting system; and the movable adjusting device comprises a rotating wheel, force transfer plates, bearing wheels and a snap ring; the rotating wheel and the bearing wheels are respectively arranged on an outer end of the gear disc and inner ends of the fixing discs by the force transfer plates; the rotating wheel is meshed with the outer end of the gear disc; the bearing wheels are movably matched with the inner ends of the fixing discs; and the snap ring is arranged on the force transfer plates and the snap ring is connected with the stay rope.

2. The installation tool for the spherical latticed shell structure of claim 1, wherein the movable adjusting device further comprises a rotation driving member for driving the rotating wheel to rotate.

3. The installation tool for the spherical latticed shell structure of claim 2, wherein the rotation driving member or the force transfer plate is provided with a locking member for limiting rotation of the rotating wheel.

4. The installation tool for the spherical latticed shell structure of claim 2, wherein the fixing frame is a circular frame or a circular ring frame which is arranged horizontally; and one or more stay rope assemblies are arranged along a circumferential direction of the fixing frame.

5. The installation tool for the spherical latticed shell structure of claim 4, wherein the fixing frame comprises a plurality of concentric and equal-diameter arc-shaped frame units which are spliced or abutted end to end.

6. The installation tool for the spherical latticed shell structure of claim 4, wherein spatially extended lines of the stay ropes are intersected with a vertical central line of the fixing frame; and the vertical central line of the fixing frame is coincident with a vertical central line of the spherical latticed shell structure.

7. The installation tool for the spherical latticed shell structure of claim 1, wherein the stay rope assembly further comprises a tightening assembly for adjusting a length of the stay rope.

\* \* \* \* \*